United States Patent Office 3,114,762
Patented Dec. 17, 1963

3,114,762
PREPARATION OF CARBONATES
Irving L. Mador, Cincinnati, Ohio, and Angus U. Blackham, Provo, Utah, assignors to National Distillers and Chemical Corporation, New York, N.Y., a corporation of Virginia
No Drawing. Filed Oct. 12, 1960, Ser. No. 62,085
10 Claims. (Cl. 260—463)

The present invention relates to a novel method for preparation of carbonates and, more particularly, to carbonates of the formula $$ROCOR \atop \|\atop O$$

wherein R is the hydrocarbon residue of an alcohol.

In accordance with this invention, carbonates of the aforesaid structures are prepared by reacting carbon monoxide with an alcohol containing a saturated aliphatic alcohol group, in the presence of a salt of a metal from the group consisting of palladium and platinum. In a specific embodiment, carbon monoxide is reacted with ethanol in the presence of palladium chloride to produce diethyl carbonate.

In carrying out the aforesaid process, the alcohol reactant is a monohydric alcohol and which, for example, may be of the methanol series, i.e., a saturated aliphatic monoalcohol such as ethanol, propanol, butanol, etc., an aromatic containing alcohol such as an alcohol of the formula

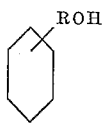

in which R is a saturated aliphatic group, illustrative of which is

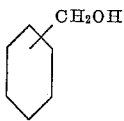

and the like.

Although the exact mechanism of the aforesaid reaction to produce the stated carbonates is not fully understood, the salt of palladium or platinum is reduced during the reaction. Thus, in preferred embodiment, the process of the present invention is carried out in the added presence of an oxidizing agent for palladium and platinum such that the salt of the palladium or platinum that is reduced to the metal during the reaction is oxidized. For that purpose, metal salts such as cupric chloride, cupric sulfate, ferric sulfate and others are suitable.

Regarding the palladium and platinum salts, the chlorides of such metals are preferred for practice of this invention. However, other halogen salts of such metals may be used, such as the bromides of palladium and platinum.

In order to further describe the invention, the following embodiments are set forth for purposes of illustration and not limitation.

Example 1

0.48 gram of palladium, 30 grams of CuCl₂ and 100 ml. of anhydrous ethanol were added to a reaction flask and refluxed until the palladium dissolved through oxidation by the copper chloride. The flask was then placed in a closed system fitted with a Vibromix stirrer and a gas measuring buret. Carbon monoxide (at one atmosphere) was then introduced over the system and, during a three day period, 20 millimoles of carbon monoxide were absorbed at room temperature. Analysis of the reaction mixture by distillation, gas chromatography and mass spectrometry showed formation of 3 mm. of diethyl carbonate, 3 mm. of diethylether and 4 mm. of ethyl chloride. Cuprous chloride (13 mm. Cu₂Cl₂) precipitated from the solution during the reaction.

Example 2

In a manner similar to that of Example 1, the reaction flask was charged with 13.5 grams of CuCl₂, 1.78 grams PdCl₂ and 100 ml. of anhydrous ethanol. The resulting mixture was refluxed until dissolution of solids occurred. During a three day period, 26 mm. of CO were absorbed. The gas phase of the reaction mixture showed, on analysis, the presence of 4.4 mm. of CO₂. The liquid phase, distilled under vacuum, showed the presence of diethylcarbonate in the amount of 7 mm. by gas chromatographic analysis.

Thus, and using for illustrative purposes the use of palladium chloride, carbon monoxide and an alcohol for the process embodied herein, and use of cupric ions for the oxidation of the palladium, it appears that the process involves the following equations:

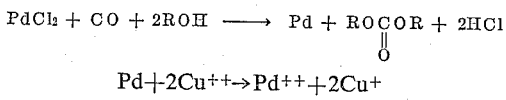

$$Pd + 2Cu^{++} \rightarrow Pd^{++} + 2Cu^{+}$$

Generally speaking, the process of this invention is carried out at from room temperature up to the boiling point of the alcohol reactant, but higher temperatures can be used, if desired, by use of super-atmospheric pressure. Thus, and although the process is carried out generally at from about 20° C. to about 100° C., use of carbon monoxide pressure of, for example, one atmosphere to 500 atmospheres or more may be used.

With reference to the use of metal salts as oxidizing agents, they are generally employed in amounts of substantially molar equivalents with the palladium or platinum and, preferably, in substantial excess such, for example, in amounts even as high as five hundred times in molar excess over the palladium or platinum.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A method for producing carbonates of the formula $$ROCOR \atop \|\atop O$$

wherein R is a hydrocarbon residue of a monohydric alcohol which comprises reacting carbon monoxide with a monohydric alcohol selected from the group consisting of lower alkanols and benzyl alcohol and with a metal salt selected from the group consisting of palladium chloride, platinum chloride, palladium bromide, and platinum bromide.

2. A method of claim 1 wherein said alcohol is ethanol.

3. A method of claim 1 wherein said alcohol is propanol.

4. A method of claim 1 wherein said alcohol is butanol.

5. A method of claim 1 wherein said alcohol is benzyl alcohol.

6. A method of claim 1 wherein said metal salt is platinum chloride.

7. A method of claim 1 wherein said reaction is carried out at a temperature ranging from room temperature up to the boiling point of said alcohol.

8. A method of claim 7 wherein said temperature is from about 20° to about 100° C.

9. A method of claim 1 wherein said reaction is carried out with an oxidizing agent selected from the group consisting of iron and copper salts wherein the anion corresponds to that of the metal salt.

10. A method of claim 9 wherein said oxidizing agent is cupric chloride.

References Cited in the file of this patent
UNITED STATES PATENTS

| | | |
|---|---|---|
| 1,603,689 | Hammond | Oct. 19, 1926 |
| 2,787,631 | Stevens | Apr. 2, 1957 |

OTHER REFERENCES

H. Remy: Treatise on Inorganic Chemistry, Vol. II, 1956, page 341.